US012625318B2

(12) United States Patent
Harker et al.

(10) Patent No.: US 12,625,318 B2
(45) Date of Patent: May 12, 2026

(54) OPTICAL FIBRE ASSEMBLIES AND METHODS OF USE

(71) Applicant: Microsoft Technology Licensing, LLC, Redmond, WA (US)

(72) Inventors: Andrew Thomas Harker, Romsey (GB); Andrew Paul Appleyard, Romsey (GB); Raymond John Horley, Romsey (GB); Ian Dewi Lang, Romsey (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

(21) Appl. No.: 18/494,422

(22) Filed: Oct. 25, 2023

(65) Prior Publication Data

US 2024/0053534 A1 Feb. 15, 2024

Related U.S. Application Data

(62) Division of application No. 17/281,330, filed as application No. PCT/GB2019/052772 on Oct. 2, 2019, now Pat. No. 11,835,755.

(30) Foreign Application Priority Data

Oct. 3, 2018 (GB) ...................................... 1816146

(51) Int. Cl.
*G02B 6/02* (2006.01)
*G01M 11/00* (2006.01)
(Continued)

(52) U.S. Cl.
CPC ......... *G02B 6/02328* (2013.01); *G01M 11/31* (2013.01); *G01M 11/33* (2013.01);
(Continued)

(58) Field of Classification Search
CPC ............ G02B 6/02328; G02B 6/02042; G02B 6/02347; G02B 6/032; G02B 6/4415;
(Continued)

(56) References Cited

U.S. PATENT DOCUMENTS

2010/0278478 A1 11/2010 Kuo
2012/0148207 A1 6/2012 Li
(Continued)

FOREIGN PATENT DOCUMENTS

CN 105403951 A * 3/2016 ......... H01S 3/06754
WO WO-2018141681 A1 * 8/2018 ......... H04B 10/0793

OTHER PUBLICATIONS

"Office Action Issued in European Patent Application No. 19787049.6", Mailed Date: Oct. 5, 2023, 7 Pages.
(Continued)

*Primary Examiner* — Michelle R Connelly

(57) ABSTRACT

An optical fibre assembly comprises a hollow core optical waveguide comprising a hollow core surrounded by a structured arrangement of longitudinally extending capillaries providing an inner cladding surrounded by an outer cladding; a diagnostic solid core optical waveguide comprising a solid core surrounded by a cladding, and extending substantially parallel to the hollow core optical waveguide; and a jacket surrounding both the hollow core optical waveguide and the solid core optical waveguide and forming a common mechanical environment for the hollow core optical waveguide and the solid core optical waveguide. The optical fibre assembly may be or may comprise or be included in an optical fibre cable, and may be used in a method for testing hollow core optical waveguides.

20 Claims, 6 Drawing Sheets

(51) Int. Cl.
    *G02B 6/032*        (2006.01)
    *G02B 6/44*         (2006.01)
    *H04B 10/071*     (2013.01)
    *H04B 10/073*     (2013.01)

(52) U.S. Cl.
    CPC ..... *G02B 6/02042* (2013.01); *G02B 6/02347*
          (2013.01); *H04B 10/071* (2013.01); *H04B*
          *10/073* (2013.01); *G02B 6/032* (2013.01);
                     *G02B 6/4415* (2013.01)

(58) Field of Classification Search
    CPC ..... G01M 11/31; G01M 11/33; H04B 10/071;
                           H04B 10/073
    See application file for complete search history.

(56)             References Cited

U.S. PATENT DOCUMENTS

| | | |
|---|---|---|
| 2014/0241681 A1 | 8/2014 | Baldwin |
| 2016/0018277 A1 | 1/2016 | Challener |

OTHER PUBLICATIONS

Communication under Rule 71(3) Received in European Patent Application No. 19787049.6, mailed on Sep. 19, 2025, 09 pages.
Notice of Allowance Received for Singapore Application No. 11202102193P, mailed on Jun. 26, 2025, 04 Pages.
Written Opinion received for PCT Application No. 11202102193P, Jan. 9, 2024, 5 pages.
Decision to grant a European patent pursuant to Article 97(1) Received for European Application No. 19787049.6, mailed on Jan. 8, 2026, 02 pages.

\* cited by examiner

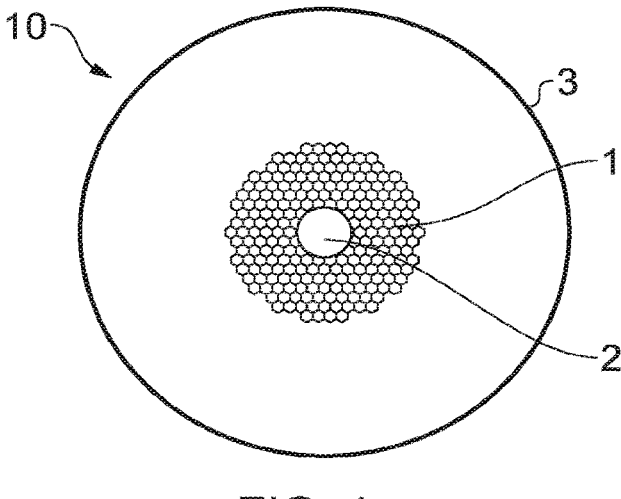
FIG. 1
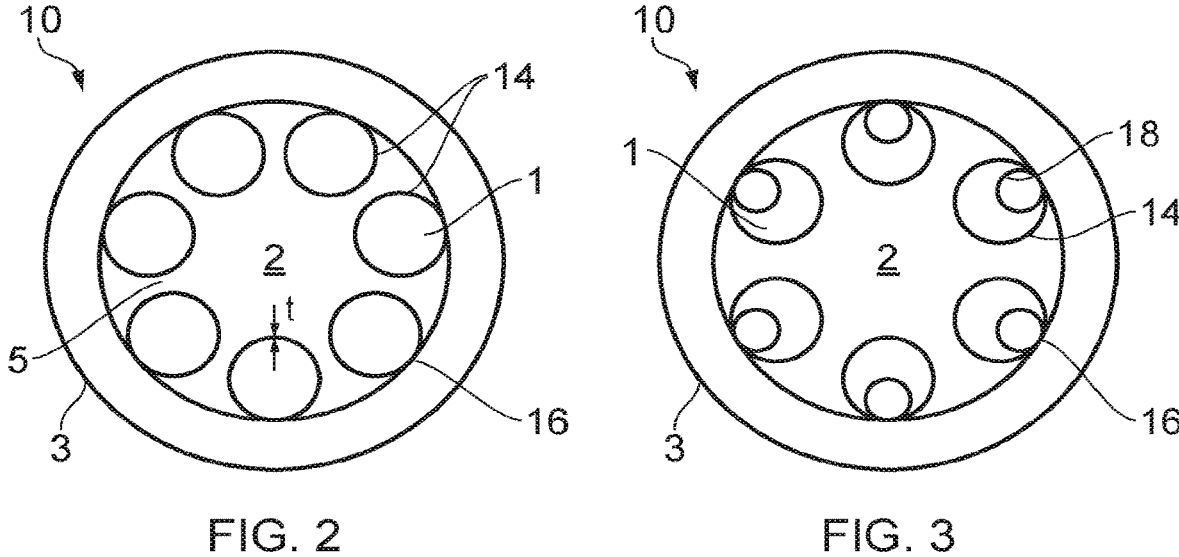
FIG. 2                    FIG. 3

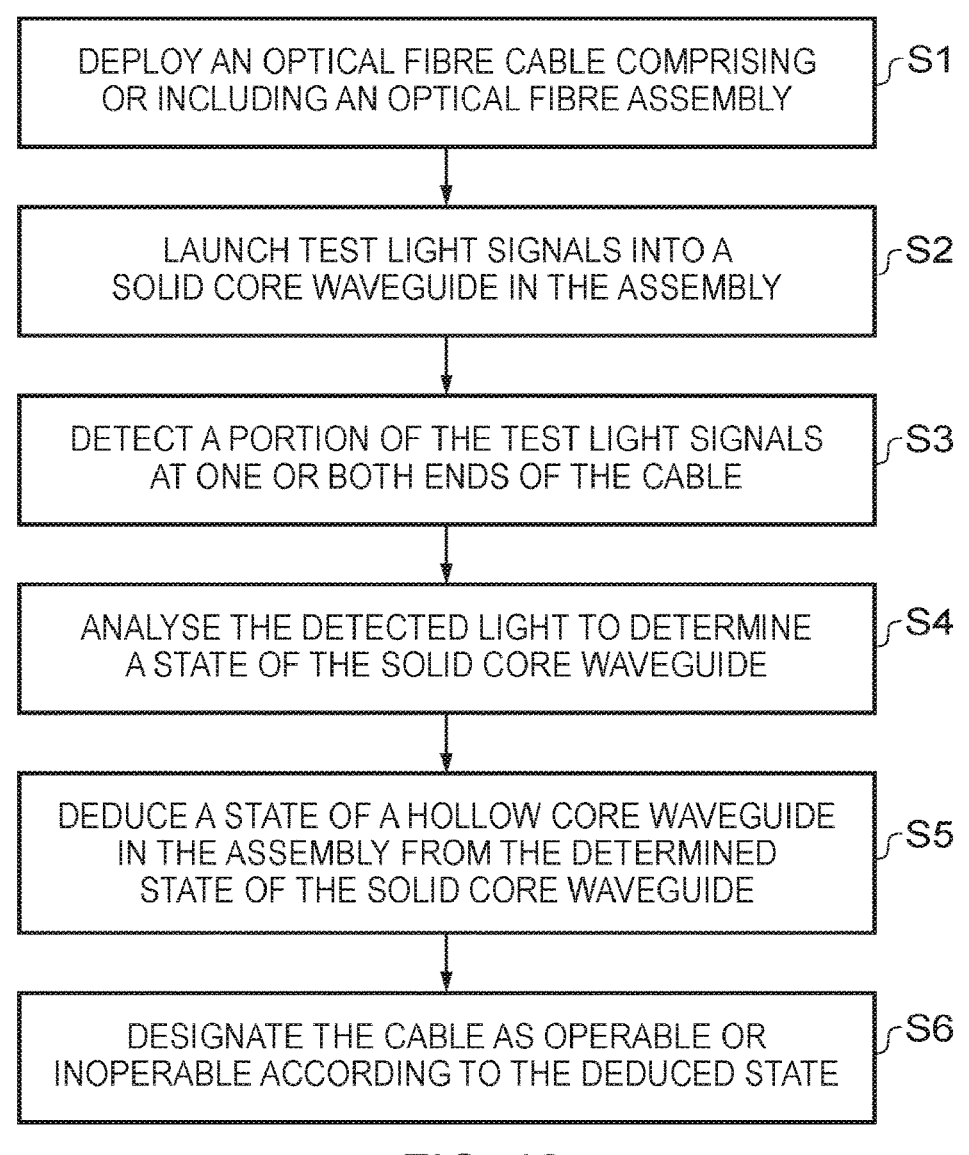

DEPLOY AN OPTICAL FIBRE CABLE COMPRISING
OR INCLUDING AN OPTICAL FIBRE ASSEMBLY — S1

LAUNCH TEST LIGHT SIGNALS INTO A
SOLID CORE WAVEGUIDE IN THE ASSEMBLY — S2

DETECT A PORTION OF THE TEST LIGHT SIGNALS
AT ONE OR BOTH ENDS OF THE CABLE — S3

ANALYSE THE DETECTED LIGHT TO DETERMINE
A STATE OF THE SOLID CORE WAVEGUIDE — S4

DEDUCE A STATE OF A HOLLOW CORE WAVEGUIDE
IN THE ASSEMBLY FROM THE DETERMINED
STATE OF THE SOLID CORE WAVEGUIDE — S5

DESIGNATE THE CABLE AS OPERABLE OR
INOPERABLE ACCORDING TO THE DEDUCED STATE — S6

FIG. 12

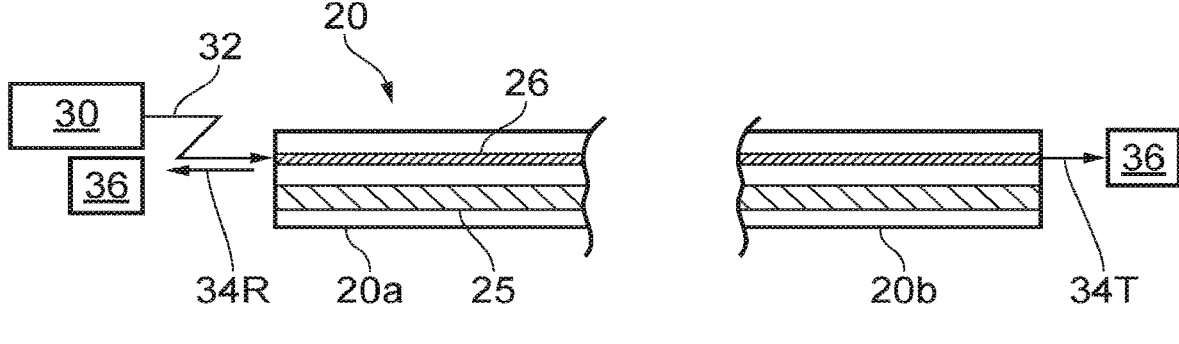

FIG. 13

OPTICAL FIBRE ASSEMBLIES AND METHODS OF USE

CROSS-REFERENCE TO RELATED APPLICATIONS

This application is a division of U.S. patent application Ser. No. 17/281,330 filed Mar. 30, 2021, which is a National Stage of PCT International Application No. PCT/GB2019/052772 filed on Oct. 2, 2019, which claims priority to GB Application No. 1816146.3 filed Oct. 3, 2018, all of which are hereby incorporated by reference.

BACKGROUND OF THE INVENTION

The present invention relates to optical fibre assemblies and methods of using the optical fibre assemblies.

An important use of optical fibres is in the transmission of data, such as in telecommunications applications, over both short and long distances. Conventionally, optical fibres having a solid waveguiding core configured for the propagation of a single optical mode (single mode or SM fibre) or multiple optical modes (multimode or MM fibre) have been used. A widely-used example is silica optical fibre carrying optical signals at a wavelength of about 1550 nm, where silica has its lowest loss so that signals can be propagated over long distances with the minimum attenuation. Optical fibres for carrying data signals can be packaged into cables including one or more fibres within an outer jacket that protects the fibres during deployment and use of the fibres.

During installation of a cable and for subsequent maintenance, various testing techniques can be used to establish that data transmission is effective and the fibres are free from defects such as breaks or significant bends that induce additional loss. Techniques include use of a visible fibre tracer, a visual fault locator and an optical loss test set (OLTS) to check for breaks during and following cable installation (continuity testing), measurement of the attenuation level in the installed fibre (insertion loss) using an OLTS, and optical time domain reflectometry (OTDR) or occasionally optical frequency domain reflectometry (OFDR) measurements on the installed fibre to verify the distributed optical loss profile along the fibre length, quality of the installation and for maintenance.

Visual fibre tracer and visual fault locator testing methods use visible light, and OTDR measures backscatter from within the optical fibre. Accordingly, these techniques are well-adapted for conventional solid core optical fibre cables, but tend to work poorly or not at all with a more recently developed type of optical fibre, namely hollow core optical fibres, which use a structured inner cladding to produce a waveguiding function. Often, a hollow core structure does not transmit visible light, and the absence of material in the central core can reduce Rayleigh backscattering below levels required by both widely deployed standard and high performance specialist OTDR systems.

Hollow core optical fibres are of significant interest for optical data transmission applications. They provide an alternative to conventional solid core fibres that offers a wide optical transmission bandwidth and low transmission loss, and enables the propagation of higher optical powers free from issues such as nonlinear and thermo-optic effects that can affect optical waves travelling in solid material. However, their incompatibility with conventional testing methods is a significant obstacle to developing this application; testing the quality of installation and longer terms checks of the integrity and performance quality of hollow core optical fibres installed in the field is challenging. Therefore, approaches to enable the testing of hollow core optical fibres and cables including hollow core optical fibres, including testing during installation and for subsequent maintenance, are of interest.

SUMMARY OF THE INVENTION

Aspects and embodiments are set out in the appended claims.

According to a first aspect of certain embodiments described herein, there is provided an optical fibre assembly comprising: a hollow core optical waveguide comprising a hollow core surrounded by a structured arrangement of longitudinally extending capillaries providing an inner cladding surrounded by an outer cladding; a diagnostic solid core optical waveguide comprising a solid core surrounded by a cladding, and extending substantially parallel to the hollow core waveguide; and a jacket surrounding both the hollow core optical waveguide and the solid core optical waveguide and forming a common mechanical environment for the hollow core optical waveguide and the solid core optical waveguide.

According to a second aspect of certain embodiments described herein, there is provided an optical fibre cable comprising or including at least one optical fibre assembly according to the first aspect.

According to a third aspect of certain embodiments described herein, there is provided a method of testing a hollow core optical waveguide, the method comprising: providing the hollow core optical waveguide in an optical fibre assembly according to the first aspect; launching one or more test light signals into the solid core optical waveguide of the optical fibre assembly; detecting a portion of the test light signals emitted from the solid core optical waveguide proximate one or both ends of the optical fibre assembly; analysing the detected portion of the test light signal to determine a state of the solid core optical waveguide; deducing a state of the hollow core optical waveguide of the optical fibre assembly from the determined state of the solid core waveguide; and designating the optical fibre assembly as operable or inoperable according to the deduced state of the hollow core optical waveguide.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, optical fibre assemblies and methods may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which:

FIG. 1 shows a schematic transverse cross-sectional view of an example hollow core photonic bandgap optical fibre to which the present disclosure is applicable;

FIG. 2 shows a schematic transverse cross-sectional view of a first example antiresonant hollow core optical fibre to which the present disclosure is applicable;

FIG. 3 shows a schematic transverse cross-sectional view of a second example antiresonant hollow core optical fibre to which the present disclosure is applicable;

FIG. 12 shows a flow chart of an optical fibre assembly test method according to the present disclosure; and FIG. 13 shows a simplified schematic view of an example optical fibre assembly according to the present disclosure undergoing a test according to a method of the present disclosure.

DETAILED DESCRIPTION

Figure 4:
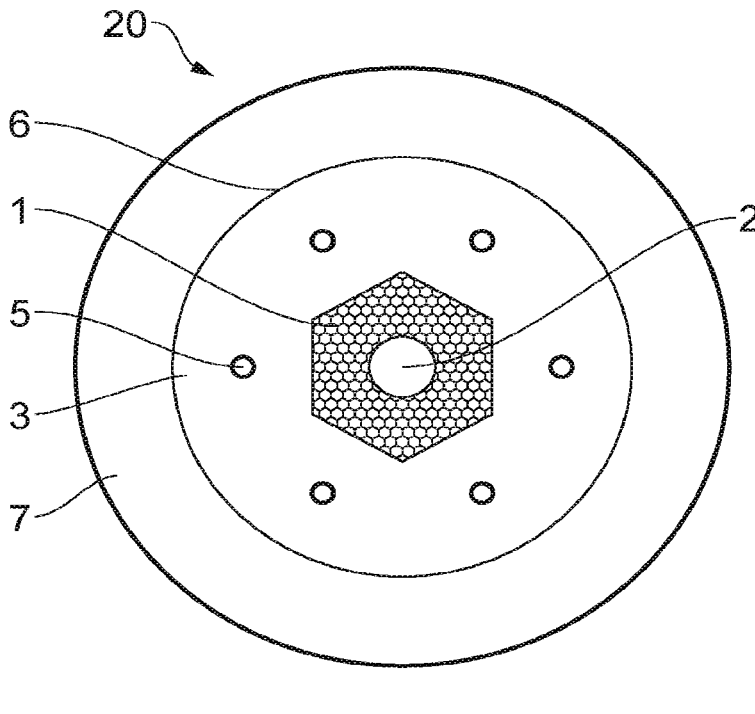
FIG. 4 shows a schematic transverse cross-sectional view of a first example optical fibre assembly according to the present disclosure.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of optical fibre assemblies and methods discussed herein which are not described in detail may be implemented in accordance with any conventional techniques for implementing such aspects and features.

The present disclosure proposes an optical fibre assembly comprising a hollow core optical waveguide and a solid core optical waveguide packaged together in a common or shared jacket. The hollow core waveguide is intended for applications such as data transmission, and the solid core waveguide enables the use of conventional fibre testing methods using visible light and/or scattering so that the assembly can be tested during and after deployment of the hollow core waveguide for use.

Hollow core optical fibre has a core in which light is guided comprising a central void (commonly filled with air, but also alternatively with another gas or mixture of gases, or a vacuum), surrounded by a cladding comprising a structured arrangement of longitudinal capillaries extending along the fibre length. The absence of a solid glass core reduces the proportion of a guided optical wave which propagates in glass compared to a solid core fibre, offering benefits such as increased propagation speed, reduced loss from both absorption and scattering, and reduced nonlinear interactions.

Hollow core fibres can be categorised according to their mechanism of optical guidance into two principal classes or types: hollow core photonic bandgap fibre (HCPBF, alternatively often referred to as hollow core photonic crystal fibres, HCPCF) [1], and antiresonant hollow core fibre (AR-HCF or ARF) [2]. There are various subcategories of ARFs characterised by their geometric structure, including kagome fibres [3, 4], nested antiresonant nodeless fibres (NANFs) [5] and tubular fibres [6]. The present disclosure is applicable to all types of hollow core fibre, including these two main classes and their associated sub-types plus other hollow core designs. Note that in the art, there is some overlapping use of terminologies for the various classes of fibre. For the purposes of the present disclosure, the term "hollow core fibre" is intended to cover all types of these fibres having a hollow core as described above. The terms "HCPBF" and "HCPCF" are used to refer to hollow core fibres which have a structure that provides waveguiding by photonic bandgap effects (described in more detail below). The terms "ARF" and "antiresonant hollow core fibre" are used to refer to hollow core fibres which have a structure that provides waveguiding by antiresonant effects (also described in more detail below).

FIG. 1 shows a cross-sectional view of an example HCPBF 10. In this fibre type, the structured, inner, cladding 1 comprises a regular closely packed array of many small glass capillaries, from which a central group is excluded to define a substantially circular hollow core 2. The periodicity of the cladding structure provides a periodically structured refractive index and hence a photonic bandgap effect that confines the propagating optical wave towards the core. These fibres can be described in terms of the number of cladding capillaries or "cells" which are excluded to make the core 2. In the FIG. 1 example, the central nineteen cells from the array are absent in the core region, making this a 19-cell core HCPBF. The structured cladding 1 is formed from six rings of cells surrounding the core 2, plus some cells in a seventh ring to improve the circularity of the outer surface of the cladding. A solid outer cladding 3 surrounds the structured cladding 1.

For simplicity, FIG. 1 shows only the structural glass elements of a HCPBF. For practical use as a single optical fibre strand, the outer cladding 3 will generally be coated with a polymer layer, which may a single layer, or a dual layer arrangement of different polymers. This layer or layers provide optical functionality by stripping out any light propagating in the outer cladding 3, and have a higher refractive index than the outer cladding 3 to achieve this. Mechanical functionality is also provided by inhibiting the transfer of any mechanical perturbations into the core which could otherwise induce microbend loss, together with physical protection from scratches, water ingress and other environmental effects.

In contrast to HCPBF, antiresonant hollow core fibres guide light by an antiresonant optical guidance effect. The structured cladding of ARFs has a simpler configuration, comprising a much lower number of larger glass capillaries or tubes than a HCPBF to give a structure lacking any high degree of periodicity so that photonic bandgap effects are not significant. Rather, antiresonance is provided for propagating wavelengths which are not resonant with a wall thickness of the cladding capillaries, in other words, for wavelengths in an antiresonance window which is defined by the cladding capillary wall thickness. The cladding capillaries surround a central void or cavity which provides the hollow core of the fibre, and which is able to support antiresonantly-guided optical modes. The structured cladding can also support cladding modes able to propagate primarily inside the capillaries, in the glass of the capillary walls or in the spaces or interstices between the cladding capillaries and the fibre's outer cladding. The loss of these additional non-core guided modes is generally very much higher than that of the core guided modes. The fundamental core guided mode typically has by far the lowest loss amongst the core guided modes. The antiresonance provided by a capillary wall thickness which is in antiresonance with the wavelength of the propagating light acts to inhibit coupling between the fundamental core mode and any cladding modes, so that light is confined to the core and can propagate at very low loss.

FIG. 2 shows a transverse cross-sectional view of an example simple antiresonant hollow core fibre. The fibre 10 has an outer tubular cladding 3. The structured, inner, cladding 1 comprises a plurality of tubular cladding capillaries 14, in this example seven capillaries of the same cross-sectional size and shape, which are arranged inside the outer cladding 3 in a ring, so that the longitudinal axes of each cladding capillary 14 and of the outer cladding 3 are substantially parallel. Each cladding capillary 14 is in contact with (bonded to) the inner surface of the outer cladding 3 at a location 16, such that the cladding capillaries 14 are evenly spaced around the inner circumference of the outer cladding 3, and are also spaced apart from each other by gaps s (there is no contact between neighbouring capillaries). In some designs of ARF, the cladding tubes 14 may be positioned in contact with each other (in other words, not spaced apart as in FIG. 2), but spacing to eliminate this contact can improve the fibre's optical performance. The spacing s removes optical nodes that arise at the contact points between adjacent tubes and which tend to cause undesirable resonances that result in high losses. Accordingly, fibres with spaced-apart cladding capillaries may be referred to as "nodeless antiresonant hollow core fibres".

The arrangement of the cladding capillaries 14 in a ring around the inside of the tubular outer cladding 3 creates a central space, cavity or void within the fibre 10, also with its longitudinal axis parallel to those of the outer cladding 3 and the capillaries 14, which is the fibre's hollow core 2. The core 2 is bounded by the inwardly facing parts of the outer surfaces of the cladding capillaries 14. This is the core boundary, and the material (glass or polymer, for example) of the capillary walls that make up this boundary provides the required antiresonance optical guidance effect or mechanism. The capillaries 14 have a thickness t at the core boundary which defines the wavelength for which antiresonant optical guiding occurs in the ARF.

FIG. 2 shows merely one example of an ARF. Many other possible ARF structures may be used in an optical fibre assembly as described herein.

FIG. 3 shows a transverse cross-sectional view of a second example ARF. The ARF has a structured inner cladding 1 comprising six cladding capillaries 14 evenly spaced apart around the inner surface of a tubular outer cladding 3 and surrounding a hollow core 2. Each cladding capillary 14 has a secondary, smaller capillary 18 nested inside it, bonded to the inner surface of the cladding capillary 14, in this example at the same azimuthal location 16 as the point of bonding between the primary capillary 14 and the outer cladding 3. These additional smaller capillaries 18 can reduce the optical loss. Additional still smaller tertiary capillaries may be nested inside the secondary capillaries 18.

ARF designs of this type, with secondary and optionally smaller further capillaries, may be referred to as "nested antiresonant nodeless fibres", or NANFs [5]. NANFs may also include smaller tubes or capillaries positioned to aid in defining the regularity of the cladding structure.

Many other capillary configurations for the structured cladding of an ARF are possible, and the disclosure is not limited to the examples described above. For example, the capillaries need not be of circular cross-section, and/or may or may not be all of the same size and/or shape. The number of capillaries surrounding the core may be for example, four, five, six, seven, eight, nine or ten, although other numbers are not excluded. An ARF will also typically have one or more layers of coating around the outer cladding 3 to render it practically usable as an optical fibre strand, as described above with reference to FIG. 1.

The ring of cladding capillaries in an ARF creates a core boundary which has a shape comprising a series of adjacent inwardly curving surfaces (that is, convex from the point of view of the core). This contrasts with the usual outward curvature of the core-cladding interface in a conventional solid core fibre, and the substantially circular core boundary of a HCPBF (see FIG. 1). Accordingly, antiresonant hollow core fibres can be described as negative curvature fibres. The kagome category of ARF can also be configured as negative curvature fibres, and has a structured cladding of multiple small capillaries in an array, similar to HCPBF, but not configured to provide photonic bandgaps. In contrast to HCPBF, the guidance mechanism operates by antiresonance effects.

Herein, the terms hollow core optical fibre, hollow core fibre, hollow core waveguide, hollow core optical waveguide and similar terms are intended to cover optical waveguiding structures configured according to any of the above examples and similar structures, where light is guided by any of several guidance mechanisms (photonic bandgap guiding, antiresonance guiding, and/or inhibited coupling guiding) in a hollow elongate void or core surrounded by a structured cladding comprising a plurality of longitudinal capillaries. The capillaries comprise or define elongate holes, voids, lumina, cells or cavities which run continuously along the length or longitudinal extent of the optical fibre, substantially parallel to the elongate core which also extends continuously along the fibre's length. These various terms may be used interchangeably in the present disclosure.

According to the present disclosure, an optical fibre assembly is proposed which comprises a hollow core optical fibre or waveguide and a solid core optical fibre or waveguide which together are held or bound within a common or shared jacket. The waveguides can be arranged inside the jacket with their longitudinal axes substantially parallel, and with their cores in a side-by-side configuration so that a transverse cross-section through the jacket includes transverse cross-sections of the hollow core waveguide and the solid core waveguide. Note that "parallel" does not indicate that the waveguides necessarily follow a straight line, but describes merely that the core-to-core distance is roughly constant. While the waveguides may be straight, in other examples they may be twisted together or otherwise follow a curved or spiral line (which is a common arrangement for waveguides bundled together in an optical fibre cable, where the fibres are periodically twisted over a defined length to help mitigate sensitivity to factors such as temperature). Accordingly, when the assembly is deployed or installed for use of the hollow core waveguide, the solid core waveguide follows substantially the same or a similar physical path. Optical fibre testing methods can be performed using the solid core waveguide, and the results can be used to deduce a likely state of the hollow core waveguide owing to the proximity and shared physical location and condition of the hollow core waveguide and the solid core waveguide inside the shared jacket. The solid core waveguide may be considered or described as a diagnostic waveguide, since its operational state determined by testing can be used to diagnose an operational state of the hollow core waveguide. More than one hollow core waveguide may be included in an assembly. Similarly, more than one solid core waveguide may be included in an assembly. Two or more different types or configurations of hollow core waveguide, and/or two or more different types or configurations of solid core waveguide may be included in a single assembly. The assembly may be configured as or in an optical fibre cable configured for deployment to provide an optical signal transmission path (for data transmission, for example), where there may, for example, be one or more layers between the waveguides and the jacket to provide the required structure or composition for the cable. A cable may comprise one or more optical fibre assemblies. Various options utilise more or fewer layers between the hollow core waveguide and the solid core waveguide, and hence offer a different balance or compromise between factors such as ease of performing diagnostics on the hollow core waveguide using the solid core waveguide, the degree or level of physical (mechanical) coupling between the hollow core waveguide and the solid core waveguide which can determine how closely test information measured or collected using the solid core waveguide reflects the condition or state of the hollow core waveguide, and ease of fabrication of the assembly and of any cable in which the assembly is included.

In a simple form, the optical fibre assembly comprises a hollow core optical waveguide comprising a hollow core surrounded by a structured arrangement of longitudinally extending capillaries providing an inner cladding surrounded by an outer cladding, a solid core optical waveguide comprising a solid core surrounded by a cladding, and extending substantially parallel to the hollow core waveguide, and a jacket surrounding both the hollow core optical waveguide and the solid core optical waveguide. The jacket is an outer layer of the assembly, and may directly surround the waveguides, or may indirectly surround the waveguides in that one or more intermediate layers may be provided between the outer surface of the waveguides and the jacket. The waveguides may have individual coating layers. The waveguides may be distinct from one another within the jacket, or may share one or more core or cladding elements or layers. Other variations are also possible, as described in more detail below.

The solid core waveguide is configured for conventional waveguiding, in that it comprises a core of solid material having a first refractive index value, surrounded by a cladding of another material having a second refractive index value which is lower than the first refractive index value. Hence, light in one or more core modes is guided for propagation along the core by total internal reflection at the core-cladding boundary in the known manner, owing to the refractive index difference between the core and the cladding. The core index may be uniform or varying (graded) across the transverse profile of the waveguide. The core may be configured to guide primarily one optical mode only, so the waveguide operates as a single mode waveguide, or it may be configured to support two or more optical modes for successful propagation, so the waveguide is a multimode waveguide. Various known mechanisms may, desirably or undesirably according to circumstances, couple some light from the core into the cladding, and the cladding itself may, generally undesirably, support one or more cladding modes.

In order to enable the solid core waveguide to be used with conventional optical fibre testing equipment, it is preferably configured to be transmissive to the appropriate wavelengths, namely one or more wavelengths or wavelength ranges in the visible spectrum, between about 400 nm and 700 nm. A visual fibre optic tracer system typically uses an incandescent bulb or a visible spectrum light emitting diode (LED) as its optical source to provide relatively low power test light for launch into a fibre under test. A visual fault locator may use a higher power of visible light, such as from a red helium neon (HeNe) laser or a visible spectrum laser diode, emitting 635 nm to 650 nm, for example. By transmissive, it is meant that at the visible wavelength or wavelengths of choice, the solid core waveguide has a loss or attenuation of not more than about 20 dB/km. Visual tracers and visual fault locators utilise light propagating in the forward direction along a waveguide, that is, a direction away from the end of the waveguide into which the light is launched. By contrast, the technique of OTDR relies on the detection of backward propagating light that arises from backscatter in the waveguide material and back-reflection from connectors, splices or flaws in the fibre structure and returns to the launch end of the waveguide. Hence, for effective testing with an OTDR system, the solid core waveguide may have good transmission at wavelengths suitable for OTDR. For example, commonly used conventional commercially-available OTDR systems often use light at wavelengths in the vicinity of 1310 nm, 1550 nm and 1625 nm. The solid core waveguide may have a Rayleigh backscatter coefficient which is the same as or similar to conventional single mode or multimode waveguides (fibres), such as the SMF 28e+® single mode optical fibre manufactured by Corning® Incorporated. For example, the solid core waveguide may have a Rayleigh backscatter coefficient for a pulse of 1 ns duration at a wavelength of 1550 nm which is −88 dB or greater, such as −82 dB or greater. Having other properties the same as or similar to those of conventional single mode or multimode waveguides is also beneficial for optimising the compatibility of the optical fibre assembly with conventional optical fibre test equipment.

For accurate diagnosis of the state of the hollow core fibre, properties of the solid core waveguide may be matched or approximated to those of the hollow core fibre. For example, the solid core waveguide may have a microbend sensitivity similar to that of the hollow core waveguide at one or more wavelengths, for example the intended operating wavelength of the hollow core waveguide, or an OTDR testing wavelength (typically 1310 nm and/or 1550 nm and/or 1625 nm as noted above). Microbends represent small (bend) perturbations along the length of the fibre that typically originate from mechanical effects such as those associated with the fibre's environment (for example, due to roughness of the surface on which the fibre is spooled), imperfect coatings and/or cabling. The typical characteristic length is less than 1 mm. The impact of these perturbations is to couple optical power out of the fundamental guided mode into other more lossy modes (such as cladding modes), which manifests as increased attenuation for the desired fundamental mode. Microbending sensitivity indicates the extent to which this loss mechanism affects a waveguide. For the present disclosure, the solid core waveguide may have a microbending sensitivity up to 200% of the microbending sensitivity of the hollow core waveguide at least at one wavelength, such as up to 150% or up to 120% or up to 100%, or about equal to the hollow core waveguide's sensitivity. In other examples, the solid core waveguide may have a microbending sensitivity which is in the range of 10% to 200%, or 10% to 150%, or 50% to 200%, or 50% to 150%, or 80% to 120% of the microbending sensitivity of the hollow core waveguide. Matching of microbending sensitivity between the hollow core waveguide and the solid core waveguide within these limits is not essential, however.

The core of the solid core waveguide may be formed from silica. The silica might be doped or undoped, and may or may not be fused. For example, the core may comprise silica (fused or unfused) which is doped with one or more of germanium, phosphorous and aluminium. Similarly, the cladding around the solid core may be formed from silica, which may be fused silica, and may or may not be doped. For example, the cladding may comprise silica doped with fluorine and/or boron, or fused silica doped with fluorine and/or boron. The solid core waveguide is not limited to being formed from silica, however, and other materials, with or without doping, may be used for either or both of the core and the cladding. Similarly, other dopant materials might be used.

The cladding around the solid core may also be solid. Alternatively, it may be structured, such as with elongate holes or lumina adjacent to the core and extending through the cladding material substantially parallel to the core.

The solid core waveguide may be configured as a single mode waveguide, a multimode waveguide, or a waveguide configured to propagate a small number of modes, such as two, three, four or five (few-moded).

FIG. 4 shows a simplified schematic transverse cross-sectional view of an optical fibre assembly according to a first example. The assembly 20 comprises a hollow core waveguide configured as a HCPBF type of hollow core waveguide. The hollow core waveguide comprises a hollow core 2 surrounded by an inner cladding in the form of a microstructured array of capillaries configured for waveguiding by a photonic bandgap effect; as in the FIG. 1 example, the waveguide is a 19-cell core HCPBF, although in this case, the microstructured capillary array forming the inner cladding 1 comprises six rings of cells only. Outside the inner cladding 1 is an outer cladding layer 3 which surrounds the inner cladding 1. Six solid core waveguides are provided in this example, each comprising a solid core 5. Each solid core 5 is embedded in the outer cladding layer 3, which therefore acts as the cladding for the solid core waveguides, such that each solid core waveguide is formed from a solid core 5 surrounded by cladding provided by the outer cladding layer 3. The six solid cores 5 are in this example evenly spaced apart around the hollow core waveguide, and equidistant from the centre of the hollow core 2, but fewer or more solid cores could be provided, and in other positions and distributions within the outer cladding layer. Finally, an outer jacket 7 is provided around the outer surface of the outer cladding layer 3, surrounding the outer cladding layer 3. The outer jacket is a shared or common layer that surrounds both the core and cladding defining the hollow core waveguide (comprising the hollow core 2, the structured inner cladding 1 and the outer cladding layer 3), and the core and the cladding defining the solid core waveguide(s) (comprising the solid core 5 and the outer cladding layer 3). In this example, the jacket 7 is a coating layer, which protects an elongate fibre strand 6 comprising the hollow core waveguide and the solid core waveguides and having an inner surface defined by the outer surface of the outer cladding layer 3. Also in this example, the outer cladding layer 3 is a single element common to both the hollow core waveguide and the solid core waveguides. The outer cladding layer 3 and the jacket 7 both have a circular cross-section, but may take other shapes, for example dictated or partly dictated by the positioning of the solid core or cores within the outer cladding layer 3.

Figure 5:
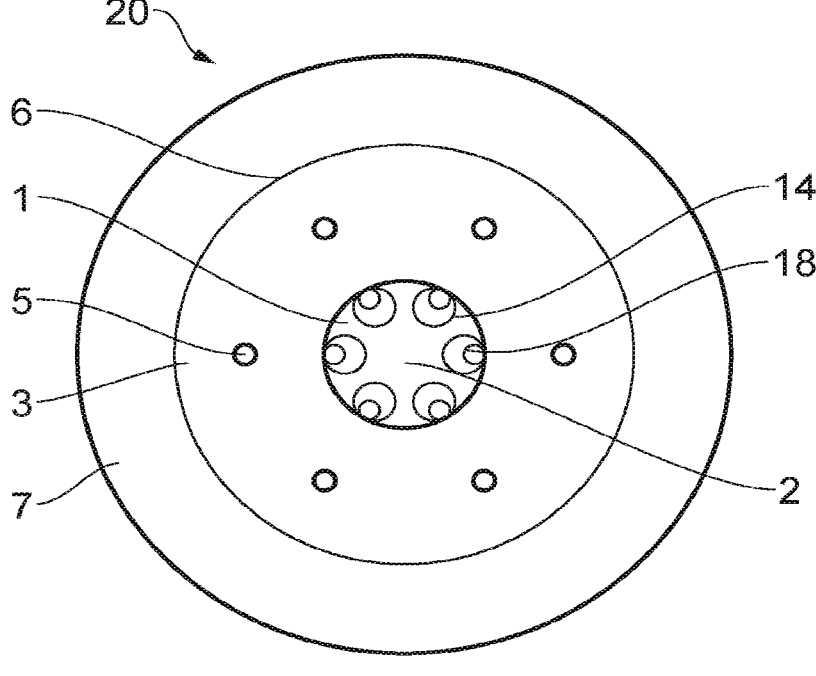
FIG. 5 shows a schematic transverse cross-sectional view of a second example optical fibre assembly according to the present disclosure.

FIG. 5 shows a simplified schematic transverse cross-sectional view of an optical fibre assembly according to a second example. This has the same configuration as the FIG. 4 example, except that the hollow core waveguide is configured for antiresonant waveguiding rather than photonic bandgap waveguiding. The structured inner cladding 1 comprises six primary capillaries 14 evenly spaced apart around the inner surface of the outer cladding layer 3, plus six secondary capillaries 18, one nested inside each primary capillary 14 as in the FIG. 3 example. Hence, the hollow core waveguide is configured as a NANF structure, comprising a hollow core 2 surrounded by a structured inner cladding 1 formed by a ring of nested capillaries 14, 18 bonded within an outer cladding layer 3. As in the previous example, the solid core waveguiding capability is provided by six solid cores 5 embedded in a circular, symmetric arrangement around the structured inner cladding 1, and a jacket 7 surrounds the outer surface of the outer cladding 3.

Figure 6:
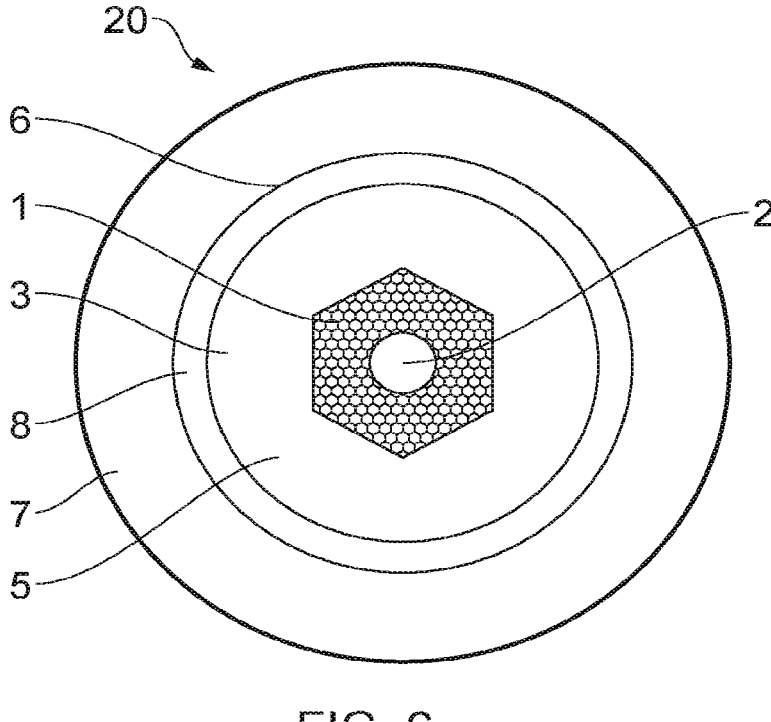
FIG. 6 shows a schematic transverse cross-sectional view of a third example optical fibre assembly according to the present disclosure.

FIG. 6 shows a simplified schematic transverse cross-sectional view of an optical fibre assembly according to a third example. As with the first example, the assembly 20 has a HCPBF waveguiding arrangement as its hollow core waveguide, comprising a hollow core 2 with a surrounding microstructured capillary array as an inner cladding 1, surrounded in turn by an outer cladding layer 3. The outer cladding layer 3 is in turn surrounded by an additional cladding layer 8. In this example, the refractive indices of the outer cladding layer 3 and the additional cladding layer 8 are chosen so that these two layers together act as the solid core waveguide; the outer cladding layer 3 surrounding the hollow core waveguide is also the core 5 of the solid core waveguide, while the additional cladding layer 8 is the cladding of the solid core waveguide. Hence the additional cladding layer 8 has a lower refractive index than the core 5/outer cladding layer 3. The hollow core waveguide is therefore disposed concentrically or co-axially inside the solid core waveguide, with a common layer utilised by both (the core 5/outer cladding layer 3), the two together forming an elongate fibre strand 6. The outer surface of the fibre strand 6 is covered by a jacket 7, which in this example is a coating layer to protect the fibre strand 6. The assembly 20 has a circular cross-section, but other shapes may be used for at least some layers, for example a polygonal cross-section for the core 5 and additional cladding layer 8 to reflect the polygonal cross-section of the inner cladding 1.

The examples of FIGS. 4, 5 and 6 each have an element or layer that functions as a cladding or core layer for both the hollow core waveguide and the solid core waveguide(s). Accordingly, there is a close mechanical coupling between the waveguides so that results obtained from testing using the solid core waveguide as a diagnostic waveguide can be assumed to reflect the state of the hollow core waveguide with good accuracy. However, these and similar designs of optical fibre assembly in which a layer acts as core/cladding for both waveguide types may be more difficult to fabricate and use than designs in which the cores and claddings of the respective waveguides are separate from one another, such as the examples of FIGS. 7-11. Designs such as these with separate waveguides still provide a useful level of mechanical coupling from which accurate diagnosis of a state or condition of the hollow core waveguide can be made, however.

Figure 7:
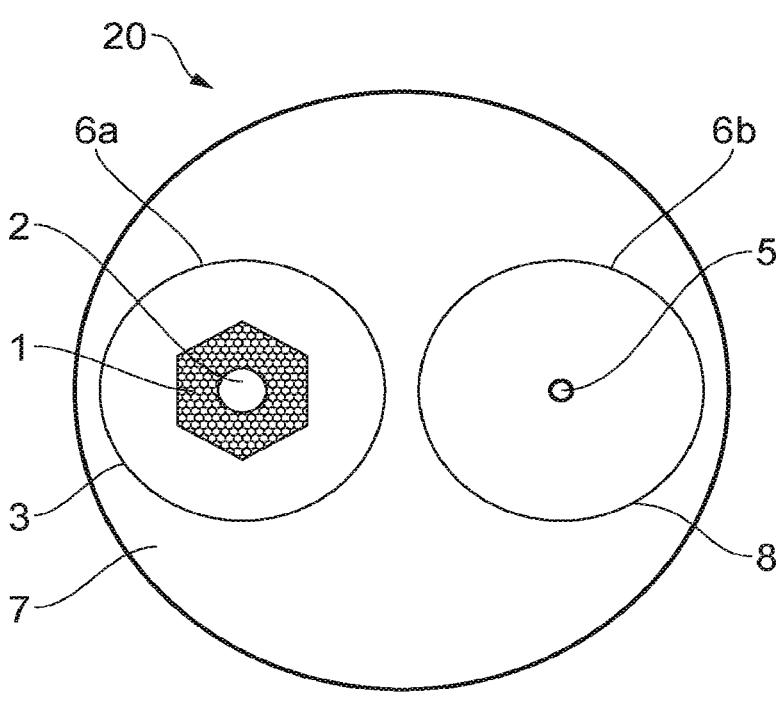
FIG. 7 shows a schematic transverse cross-sectional view of a fourth example optical fibre assembly according to the present disclosure.

FIG. 7 shows a simplified schematic transverse cross-sectional view of an optical fibre assembly according to a fourth example. The assembly 20 comprises a hollow core waveguide comprising a hollow core 2 with a surrounding microstructured capillary array as an inner cladding 1, as in the examples of FIGS. 4 and 6. An outer cladding 3 surrounds the inner cladding 1. The assembly 20 also includes a solid core waveguide comprising a solid core 5 surrounded by a cladding layer 8. The cladding 8 may have a substantially circular cross-section, with a diameter of about 125 μm, although other sizes may be used. The outer cladding 3 and the cladding 8 are entirely separate in this example; there is no element that acts as core and/or cladding for both waveguides. Hence, the hollow core waveguide and the solid core waveguide are each an individual fibre strand 6a, 6b. A jacket 7 surrounds both fibre strands 6a, 6b, in the form of a coating over the outer surfaces of the outer cladding 3 and the cladding 8. Note that the two fibre strands 6a, 6b are spaced apart within the material of the jacket 7 in this example, so that there is jacket material disposed between the outer cladding 3 and the cladding 8. In other designs the strands 6a, 6b may be in contact. The strands 6a, 6b may be arranged to enable optical contact (coupling of light between the waveguides), what may be useful in some circumstances, or to prevent optical contact, for example in order to minimise cross-talk between the strands 6a, 6b. The two fibre strands 6a, 6b may be arranged with their longitudinal axes substantially parallel, so as to extend alongside one another in a side by side arrangement along the length of the fibre assembly 20, the outer surface of which is formed by the jacket 7. The coating provided by the jacket 7 protects the fibre strands 6a, 6b within. The jacket has a substantially circular cross section in this example. Material used for the jacket may be a substance that can be readily torn or cut, so that the two waveguide strands 6a, 6b can be "peeled" apart (separated along a longitudinal direction of the assembly 20); this can aid in coupling of the waveguides to optical equipment or other lengths of optical fibre so that they can be used for their different purposes. Optical fibre assemblies of similar construction but incorporating multiple solid core fibres only are often referred to as multi-element fibres (MEFs) and have found previous use in the context of high power lasers, amplifier arrays and fibre transmission lines [7].

Figure 8:
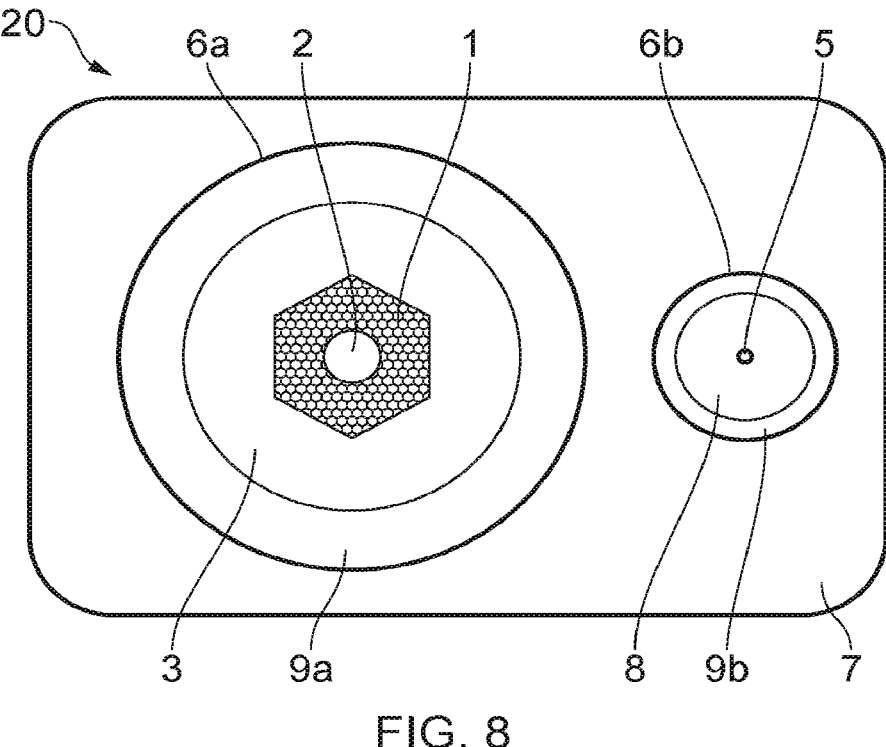
FIG. 8 shows a schematic transverse cross-sectional view of a fifth example optical fibre assembly according to the present disclosure.

FIG. 8 shows a simplified schematic transverse cross-sectional view of an optical fibre assembly according to a fifth example. The assembly 20 comprises one hollow core waveguide and one solid core waveguide. The hollow core waveguide comprises a hollow core 2 surrounded by a microstructured array of capillaries as an inner cladding 1, which is in turn surrounded by an outer cladding 3. The outer surface of the outer cladding 3 is provided with a coating layer 9a, to provide a first coated optical fibre strand 6a. The solid core waveguide comprises a solid core 5 surrounded by a cladding layer 8, the outer surface of which is provided with a coating layer 9b. This provides a second coated optical fibre strand 6b. Note that the coating layers may be a single layer or may comprise two or more layers; this is discussed in more detail below. The two coated fibre strands 6a, 6b are disposed in a side-by-side arrangement, similar to the uncoated fibre strands in the FIG. 7 example, with their longitudinal axes extending substantially parallel to one another. In this position, the coated fibre strands 6a, 6b are embedded in or surrounded by a jacket 7, forming the outer layer of the assembly 20. In this example, the jacket 7 is shaped and configured as a ribbonising housing or layer, being a means to combine the fibre strands 6a, 6b into an optical fibre ribbon or ribbon cable. A material such as ultraviolet curable acrylate may be used for the ribbonising layer, such as FibreCoat 827F available from Farbwerke Herkula® SA/SG (Sankt Vith, Belgium). The ribbonising layer may comprise two or more laminated elements or layers. An assembly formed as ribbon includes a number of longitudinally parallel optical fibre strands arranged in a linear array across the assembly's transverse cross-section. The array may comprise a single row of fibre strands, or two or more rows stacked on one another, but overall the array typically has a flat, rectangular shape with the number of strands in a row greater than the number of rows. The array is maintained in this shape by encapsulation in a suitable coating layer (the jacket 7), which typically preserves the overall flat, planar external shape of the array of strands, hence the term "ribbon". The material of the ribbonising jacket layer may be rollable [8]. The FIG. 8 example is particularly simple, comprising only two fibre strands 6a, 6b; typically a larger number of fibre strands will be grouped together inside a ribbon. In particular, a plurality of hollow core waveguides may be included. A ribbon may be used directly as a fibre cable for deployment, or one or more ribbons may be positioned or bundled together inside one or more additional jackets or coatings to create a cable. Note that the two fibre strands 6a, 6b are spaced apart within the material of the ribbon's jacket 7 in this example, so that there is jacket material disposed between the two coating layers 9a, 9b. In other designs a strand may be in contact with one or more adjacent strands in the array.

Figure 9:
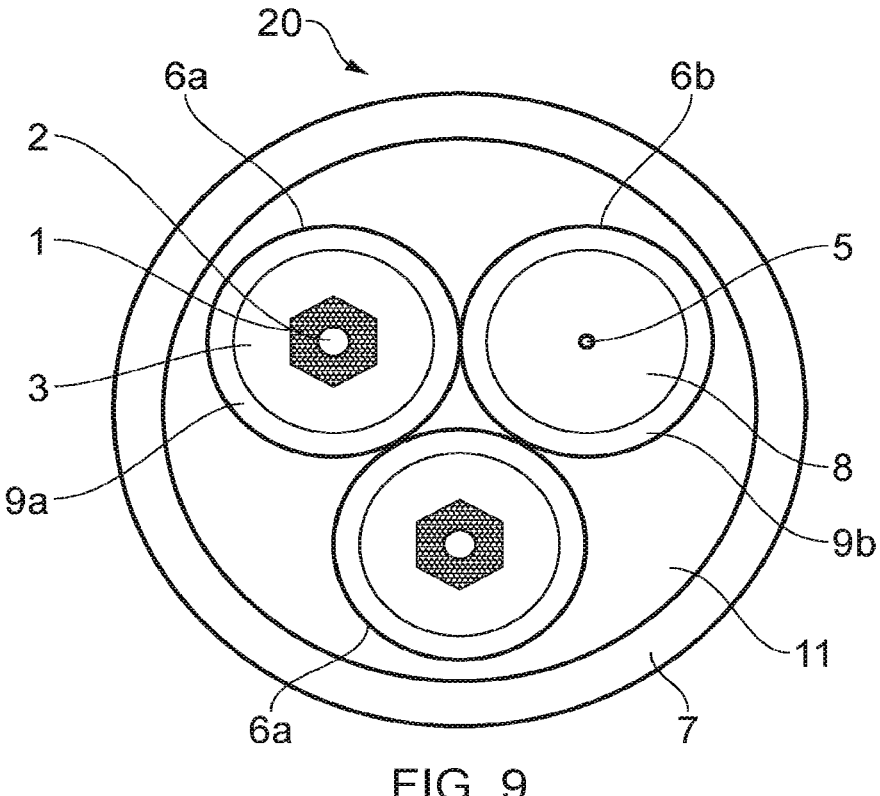
FIG. 9 shows a schematic transverse cross-sectional view of a sixth example optical fibre assembly according to the present disclosure.

FIG. 9 shows a simplified schematic transverse cross-sectional view of an optical fibre assembly according to a sixth example. The assembly 20 includes two hollow core waveguides and one solid core waveguide. Each hollow core waveguide comprises a hollow core 2 surrounded by a microstructured array of capillaries as an inner cladding 1, which is in turn surrounded by an outer cladding 3. The outer surface of the outer cladding 3 is provided with a coating layer 9a, to provide a coated hollow core optical fibre strand 6a. The assembly 20 therefore includes two such strands 6a (although more could be included if desired). The solid core waveguide comprises a solid core 5 surrounded by a cladding layer 8, the outer surface of which is provided with a coating layer 9b. This provides a coated solid core optical fibre strand 6b. The three strands 6a, 6b (plus additional strands if desired) are grouped together in a longitudinal parallel arrangement; note that they form a bundle, in contrast with the linear flat array of the ribbon example of FIG. 8. Also, the three strands 6a, 6b have their outer surfaces in contact with one another, but this is not essential. The strands 6a, 6b are bound together by an inner buffer layer 11 which surrounds the coating layers 9a, 9b of all the strands, encapsulating the strands together. The inner buffer layer 11 is in turn surrounded by a jacket 7, being in this example an outer buffer layer. The buffer layers may be formed from polymer coatings, and act to protect the fibre strands 6a, 6b from damage and to secure them into the desired spatial relationship (in contact, or isolated from one another). The buffer layers may be applied by techniques including spraying, dipping and extrusion. Although this example shows two buffer layers, which may for example comprises different polymer materials, a single buffer layer may be used, that both encapsulates the individual coated fibre strands 6a, 6b and provides the jacket 7 of the assembly 20. Examples of suitable materials for the inner buffer layer 11 and the outer buffer layer 12 are respectively FibreCoat830/801 and FibreCoat831/814, both available from Farbwerke Herkula® SA/AG (Sankt Vith, Belgium).

Figure 10:
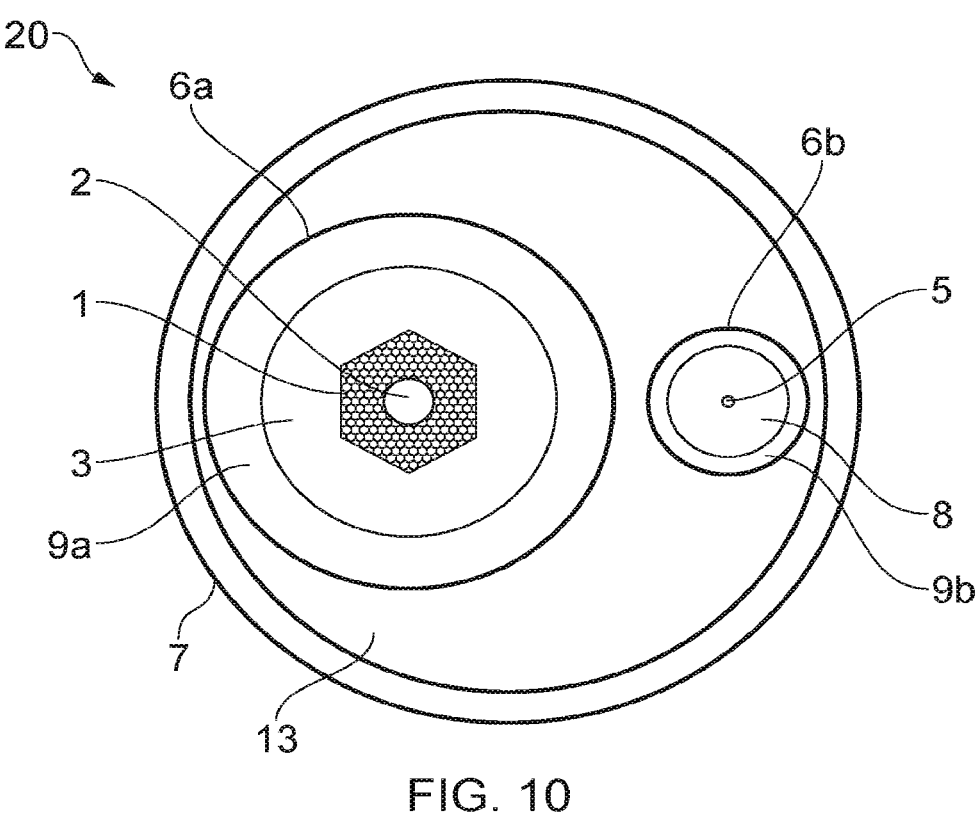
FIG. 10 shows a schematic transverse cross-sectional view of a seventh example optical fibre assembly according to the present disclosure.

FIG. 10 shows a simplified schematic transverse cross-sectional view of an optical fibre assembly according to a seventh example. The assembly 20 includes one hollow core waveguide and one solid core waveguide. The hollow core waveguide comprises a hollow core 2 surrounded by a microstructured array of capillaries as an inner cladding 1, which is in turn surrounded by an outer cladding 3. The outer surface of the outer cladding 3 is provided with a coating layer 9a, to provide a coated hollow core optical fibre strand 6a. The solid core waveguide comprises a solid core 5 surrounded by a cladding layer 8, the outer surface of which is provided with a coating layer 9b. This provides a coated solid core optical fibre strand 6b. Note that further coated hollow core fibre strands and/or further coated solid core fibre strands could be included if desired. The two strands 6a, 6b are grouped together in a longitudinal parallel arrangement and placed within a jacket 7, comprising an outer layer of the assembly 20 and which in this example has the form of a hollow tube. The tube, which may be rigid or flexible, protects the fibre strands 6a, 6b. An example of a suitable material from the tube is polybutylene terephthalate (PBT). It has a circular cross-section, so that its inner volume is cylindrical. The fibre strands 6a, 6b may or may not be closely packed within this volume, so might be in contact, or as illustrated might be spaced apart, or free to move within the volume. In general, though, there will be some space in the volume which is not occupied by the fibre strands 6a, 6b. Usefully, this is filled with filler material 13, which may be a gas, a gel, a solid, or a mixture of these options. A solid or a gel filler can act to better maintain the spatial arrangement of the fibre strands 6a, 6b and to aid in protecting them, for example. Further, the filler material 13 may be water-blocking, in that it inhibits or prevents the passage of water or other liquids through it, thereby protecting the fibre strands 6a, 6b from water if there is any water ingress inside the tubular jacket 7. Examples of suitable materials are water-blocking gels available from Info-Gel (Charlotte, North Carolina, USA) and water-swellable yarns available from Roblon A/S (Frederikshavn, Denmark).

Figure 11:
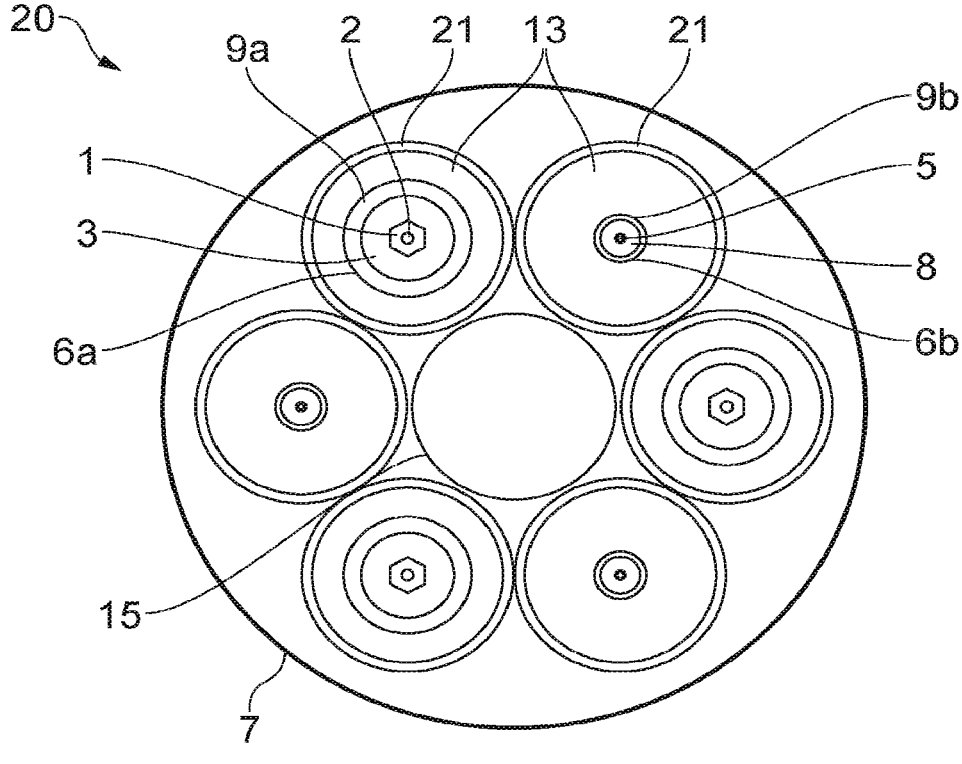
FIG. 11 shows a schematic transverse cross-sectional view of a eighth example optical fibre assembly according to the present disclosure.

FIG. 11 shows a simplified schematic transverse cross-sectional view of an optical fibre assembly according to an eighth example. This assembly 20 includes three hollow core waveguides and three solid core waveguides, although more or fewer of either or both waveguides could be included in alternative designs. Each hollow core waveguide comprises a hollow core 2 surrounded by a microstructured array of capillaries as an inner cladding 1, which is in turn surrounded by an outer cladding 3. The outer surface of the outer cladding 3 is provided with a coating layer 9a, to provide a coated hollow core optical fibre strand 6a. Each solid core waveguide comprises a solid core 5 surrounded by a cladding layer 8, the outer surface of which is provided with a coating layer 9b. This provides a coated solid core optical fibre strand 6b. Each fibre strand 6a, 6b is placed within a hollow tube 21, which may be rigid or flexible. Each tube has a circular cross-section in this example, defining a cylindrical inner volume to accommodate a fibre strand 6a, 6b centrally within it. The volume is larger than the fibre strand 6a 6b in this example, and is filled with a filler material 13 which may be a gas, a gel, a solid or a mixture of such materials. The filler material 13 may be water blocking, such as the examples of suitable water blocking materials discussed with regard to FIG. 10. The six tubes 21, each containing a fibre strand 6a, 6b, are grouped in a ring arrangement around a central elongate strengthener or strength member 15 which in this example has a circular cross section. The strengthener 15 may, for example, be made from glass reinforced plastic (GRP), although other material are not excluded. The tubes 21 are each in contact with the strengthener 15 and with the two adjacent tubes 21 around the ring, although there may alternatively be some separation between adjacent tubes and/or between the tubes 21 and the strengthener 15. Spacing elements might be included to aid positioning, for example. The longitudinal axes of the individual waveguides are substantially parallel to one another, so that the waveguides may each follow a substantially straight line, or may be twisted around one another or follow some other curved line, with a substantially or roughly constant core-to-core spacing or separation. The group comprising the central strengthener 15 and the six tubes 21 is encapsulated or bound together by coating with a jacket material, to provide a jacket 7. The jacket 7 surrounds all the waveguides and provides an outside layer for the assembly 20. An example of a suitable material for the jacket 7 is a low smoke, zero halogen polymer, although other polymers and indeed other materials might be used.

Note that more than one strengthener may be included in an assembly. Assemblies in line with any of the examples may include one or more strengtheners. A strengthener may or may not be centrally disposed within a group or array of tubes containing fibre strands or of coated or uncoated fibre strands. Also, an assembly in line with the FIG. 11 example may lack any strengthener, and/or may include only one hollow core waveguide and one solid core waveguide, each in its own tube.

Although the illustrated examples show a particular type of hollow core waveguide in each case, any hollow core waveguide types may be used in any configurations of assembly. Any assembly may include one or more than one hollow core waveguide, and/or one or more than one solid core waveguide. In configurations with multiple waveguides, all the hollow core waveguides may or may not be the same type, or the same design within a type, and all the solid core waveguides may or may not be the same.

An optical fibre assembly in accordance with this disclosure may include further layers or elements in addition to those described. Additionally layers of buffer material or binder material might be included, intermediate layers between the various described layers might be added, or further outer layers might be added. Assemblies according to the examples or variations thereof that will be apparent to the skilled person may be suitable directly for deployment as an optical fibre transmission cable, or may be grouped or bundled together with other assemblies inside a suitable outer layer, coating or jacket to provide a structure suitable as a deployable cable. For instance, assemblies in line with the examples of FIGS. 4 to 10 may be incorporated into cables, of which there are many designs known to the skilled person. The cables may comprise additional elements, such as strength members, binder tapes, aramid yarns, water swellable yarns, glass roving, flame barrier tapes and ripcords, as known to the skilled person.

With reference to the examples of FIGS. 4 and 5, the elongate optical fibre strand 6 may additionally comprise identifiers or identification means to enable individual identification of each of the solid core, diagnostic waveguides. Identifiers may be used in other examples too.

The coatings of the waveguides included in some of the examples may be of any suitable material, such as acrylate, or silicone. Also, the coating layers 9a, 9b may be a single layer of coating material, or may comprise a primary coating layer and a secondary coating layer, which may or may not be of different materials. A dual layer coating structure of this kind may be used to reduce the intrinsic microbend sensitivity of each individual optical fibre or waveguide, as well as offering tailored mechanical protection. An example material suitable for a primary coating is DeSolite® DP1032 and an example material suitable for a secondary coating is DeSolite® DS2042, both available from DSM Functional Materials (Hoek van Holland, Netherlands).

Existing techniques for fabricating optical fibre cables and assemblies of two or more optical fibres for inclusion in optical fibre cables may be used to fabricate optical fibre assemblies and cables according to the present disclosure, by replacing least one conventional fibre with a hollow core waveguide, while still including a solid core waveguide. Various techniques for fabricating hollow core waveguides are known [9, 10] and may be used to obtain one or more hollow core waveguides for inclusion in an optical fibre assembly together with one or more solid core waveguides. Any known technique may be used for producing the solid core waveguides. With specific reference to the example of FIG. 6, in which the hollow core waveguide is co-axially located within the solid core waveguide, a plasma-based vapour deposition technique may be used to deposit the additional cladding layer 8 over the inner cladding layer 3/core layer 5 of a preform from which the fibre strand 6 will be drawn. For the examples of FIGS. 4 and 5, in which the cladding of the solid core waveguides is also the outer cladding of the hollow core waveguides, the solid cores 5 can be embedded in the material of the outer cladding 3 when a preform for the fibre strand is assembled, allowing all the waveguides to be drawn together in a single strand from the preform. Referring to the example of FIG. 7, in which an uncoated fibre strand for each of the hollow core waveguide and the solid core waveguide are bound together inside a jacket coating, the two fibre strands can be drawn simultaneously from two preforms, one for each waveguide. If the preforms are held adjacently in a chuck, rotation of the chuck during the fibre drawing can twist the two fibre strands together [11]. The jacket can then be applied.

The incorporation of at least one solid core waveguide in a fibre assembly containing one or more hollow core waveguides for optical signal transmission applications enables existing optical fibre testing and diagnostic techniques to be performed on the fibre assembly using conventional test equipment, even though conventional testing is poorly suited for use with hollow core waveguides.

FIG. 12 shows a flow chart of steps in an example method of testing, performed using an optical fibre assembly according to the present disclosure. In a first step S1, an optical fibre cable which includes or comprises at least one optical fibre assembly according to the present disclosure, is deployed to provide an optical signal transmission pathway defined by the hollow core waveguide or waveguides in the assembly. In step S2, during or after deployment, one or more test light signals (comprising electromagnetic radiation with a wavelength, wavelengths or band of wavelengths between about 300 nm and about 3000 nm) are launched into the solid core waveguide or waveguides in the assembly, proximate a first end of the pathway. In step S3, a portion or portions of the one or more test light signals emitted from the solid core waveguide or waveguides are detected proximate one or both of the first end of the pathway and a second end of the pathway opposite to the first end. The light may be emitted from an end of the solid core fibre, or scattered out from the side of the fibre. In step S4, the detected portions of the test light signals are analysed to determine a state or condition of the solid core waveguide or waveguides, the state or condition being how well or poorly the waveguide is able to propagate light (in accordance with standard fibre testing). In step S5, a state of the hollow core waveguide or waveguides is deduced as being approximate to the determined state of the solid core waveguide or waveguides. Finally in step S6, the optical fibre cable or an element thereof is designated as operable or inoperable for optical signal transmission according to the deduced state of the hollow core waveguide. Any optical fibre testing procedure developed for use with conventional solid core fibre cables can be used, including visual fibre tracers, visual fault locators, optical time domain reflectometry, and optical frequency domain reflectometry. Note that in the case of visual testing methods, the "detecting" and "analysing" of the test light signals may comprise simply a visual observation by the tester and assessment of that observation based on knowledge and experience of the tester.

The method of FIG. 12 may also be applied for testing optical fibre assemblies incorporating hollow core waveguides that are not deployed or not yet deployed for optical signal transmission, in which case the optical signal transmission pathway is simply an optical propagation path along the length of the fibre assembly, through the hollow core waveguide.

Often, an optical fibre cable will comprise many optical fibres or waveguides (hundreds of fibres, for example) intended for signal transmission within a single jacket. A cable might be formed from multiple assemblies according to various examples herein packaged together into a cable format. In these cases, it is not necessary to designate an entire cable as inoperable for optical signal transmission as in step S6 above. Many hollow core fibres in a cable may still be usable. Accordingly, in a testing method an optical fibre cable may be designated in step S6 as partially inoperable, as an alternative to the operable and inoperable designations. One or more hollow core waveguides in close proximity to or otherwise associated with a solid core waveguide that shows a poor state or condition under testing can be designated as inoperable, and the cable overall designated as partially inoperable (or partially operable). For example, a cable may comprise a plurality of assemblies as described herein, such as the assembly of FIG. 9. A solid core waveguide showing a poor condition can allow the hollow core waveguide or waveguides within the same assembly to be designated as inoperable. Then, when the optical fibre cable is put into service for optical signal transmission, the hollow core waveguides in the inoperable assembly are not used.

Within an optical fibre assembly or cable according to the present disclosure, the hollow core waveguide(s) and the solid core waveguide(s) are arranged with their cores substantially parallel along the longitudinal extent of the assembly or cable, as noted above. Also as noted above, this does not imply any limitation on the waveguides being straight within the assembly, and merely indicates that the core-to-core spacing is roughly constant with length. Optical fibre cables commonly have a "stranded" configuration, where the waveguides or fibres (or elements/assemblies comprising more than one waveguide) are twisted or twined together. In helical stranding, each waveguide or element follows a helical path about the cable's longitudinal axis, which may be left-handed (S) or right-handed (Z) in direction. In SZ stranding, the lay of the stranding alternates between the S and Z directions every several turns [12]. Apparatus to manufacture helically stranded cables is generally simpler but is limited in the length of cable that can be produced, while SZ stranded cable can be produced in longer lengths and at much greater speed. These and other stranded configurations are considered within the scope of "parallel" herein, and optical fibre assemblies according to the present disclosure may be configured in these ways.

The described methods can be employed using optical fibre assemblies as described herein whether or not an assembly is incorporated into an optical fibre cable. The term "optical fibre cable" is intended to cover one or more optical fibres intended for the transmission of optical signals which are packaged in order to provide a format which is robust or sturdy so as to be able to be deployed for the intended transmission. Optical fibres have many uses so an assembly might alternatively be provided in a format aimed at other applications, where packaging suitable for deployment for signal transmission is not included or is adapted or replaced with packaging suitable for other purposes. The method may still be used to test the hollow core fibre(s) in the assembly by using the solid core fibre(s). Similarly, the method may be used to test hollow core fibre(s) in an assembly which is yet to be packaged into a cable format.

FIG. 13 shows a simplified schematic representation of an optical fibre assembly (comprised or not comprised in or as an optical fibre cable) under test using a method such as the FIG. 12 example. The elongate optical fibre assembly 20 has a first end 20a and a second end 20b, and at least one hollow core waveguide 25 and at least one solid core waveguide 26 extending along its length from the first end 20a to the second end 20b. For testing, test light 32 (electromagnetic radiation) from an optical source 30 is launched into the solid core waveguide 26 proximate the first end 20a of the assembly 20. Depending on the test being carried out, the test light 32 may have a particular wavelength or wavelengths or be broad spectrum (white light). Typically, the wavelength, wavelengths or band of wavelengths falls within the range of 300 nm to 3000 nm, and may be in the form of pulses or be a continuous emission. The test light 32 propagates along the solid core waveguide 26 so that a portion 34T of it reaches the far, second end 20b of the assembly 20. This is the part of the test light that has been transmitted along the solid core waveguide 26. Some of the test light will be reflected or back scattered from features within the solid core waveguide 26 and will return back along the solid core waveguide 26 to the first end 20a, to give a portion 34R. Either or both of these portions 34T, 34R can be detected by detectors 36 proximate the ends 20a, 20b of the assembly (where for visual test methods, the "detector" may simply be an eye or eyes of the tester). The detected test light indicates a state of the solid core waveguide 26, from which a state of the hollow core waveguide 25 can be deduced, as described with reference to FIG. 12.

The configuration of a fibre assembly having a diagnostic solid core optical waveguide and a hollow core optical waveguide within the same, shared jacket creates a common mechanical environment shared and experienced by both optical waveguides. Any mechanical disruption to the assembly, such as a break, bending (microbending and macrobending) or other distortion can inhibit the hollow core optical waveguide from propagating light at or near its full performance capability, or indeed at all. The shared mechanical environment created by the jacket enables the solid core waveguide to experience any such disruption in common with the hollow core waveguide. Hence, any propagation issues, problems or defects identified by optical fibre testing techniques applied to the solid core waveguide can be assumed to be also present in the hollow core waveguide, since both waveguides are considered to be affected in the same or similar manner by any mechanical disruption, owing to the common environment. In this way, measurements obtained from testing optical propagation in the solid core waveguide are considered to reflect or echo the current propagation capability of the hollow core waveguide. Hence the solid core waveguide can be used to identify or diagnose disruption of the hollow core waveguide.

Note that the jacket is a component of the optical fibre assembly that provides the shared mechanical environment, by encompassing both waveguides, and being a structural layer lying outside or beyond the cladding of solid core waveguide and the outer cladding of the hollow core waveguide. Depending on the configuration of the assembly, the jacket may comprise different materials and provide different functions in addition to the mechanical environment. For instance, in the examples of FIGS. 4, 5 and 6, the jacket comprises one or more coating layers, and hence provides a coating to configure the assembly as an optical fibre strand (as discussed with reference to FIG. 1), delivering optical functionality, mechanical functionality and physical protection. In the example of FIG. 7, the jacket may be a similar coating layer or layers, but the differentiated separate nature of the waveguides means that the assembly is not strictly speaking an optical fibre strand, although the coating produces the same functions. In the examples of FIGS. 8, 9, 10 and 11, where there are elements intermediate between the waveguide claddings and the jacket, including layers of coating, the jacket provides primarily a mechanical function and physical protection, with no optical functionality.

The shared mechanical environment provides a mechanical relationship or coupling between the solid core waveguide and the hollow core waveguide, the presence of which makes valid the assumption that disruption detected in the solid core waveguide is also present in the hollow core waveguide, so that the diagnosis is meaningful. The solid core waveguide is located in physical proximity with the hollow core waveguide, such as in the foregoing examples, with this relationship maintained by the surrounding jacket. The physical proximity may or may not involve physical contact between components of the waveguides (core or cladding or any coating layers). Hence, there may be some material intervening between the adjacent waveguides; depending on the configuration this might be material of the jacket, or may be some other material between the waveguides and the jacket such as a filler or binder material. Overall, the structure comprising the hollow core waveguide, the solid core waveguide and the jacket is configured so that both waveguides experience external physical effects or impacts on the assembly in the same or similar manner. Usefully, the hollow core waveguide and the solid core waveguide may be arranged so that their cores are as closely spaced as possible within any constraints of the overall structure of the assembly and any larger fibre cable or fibre bundle in which the assembly may be incorporated. Close proximity of this kind allows the experience of the two waveguides to be the same or have a high or useful degree of similarity, to maximise the accuracy of the diagnosis.

In some examples, such as the assemblies of FIGS. 4, 5 and 6, the shared cladding layer, typically formed of silica, contributes substantially to the mechanical coupling between the solid core waveguide and the hollow core waveguide. In examples in line with the assemblies of FIGS. 7 and 9, close proximity or contact between the various fibre strands in the material within which they are embedded (the material of the jacket 7 or the filler 11) aids mechanical coupling. For example, multiple hollow core waveguide strands could be arranged in a ring around a central solid core waveguide strand, either in contact with adjacent hollow core waveguide strands and the solid core waveguide strand, or very closely spaced therefrom.

Mechanical coupling may also be enhanced by the inclusion of rigid materials in the assembly, and/or minimal use of soft materials in the assembly. These two criteria may need to be balanced against one another to provide a practical or workable assembly. Materials such as nylon and Hytrel® may respectively replace less rigid materials such as PBT and ultraviolet curable acrylate (mentioned above). However, some material softness may be desirable for effective protection of the waveguides from microbending. Soft material inclusion can be reduced by minimising the volume of filler material in assemblies utilising this element. For example, the volume may be reduced by including elongate strands of low smoke, zero halogen polymer, Hytrel®, nylon or similar material of a similar diameter to the fibre strands within a tube acting as the jacket (such as in the examples of FIGS. 9, 10 and 11). Again, a comprise should be made between this approach and retaining some protection from microbending.

The diagnosis of the state of the hollow core waveguide from testing of the state of the solid core waveguide can be enhanced if one or more optical properties or characteristics (that is, properties that determine the optical propagation specification of the waveguide) are matched between the hollow core waveguide and the solid core waveguide. Matching can make effects on the waveguides' optical performances caused by external mechanical disruption more similar, so the measured performance of the solid core waveguide determined by testing more closely reflects that of the hollow core waveguide, and the diagnosis is made more accurate. The term "matched" is intended to mean that an optical property or characteristic of the solid core waveguide has the same value or substantially the same value as that property or characteristic in the hollow core waveguide; the property is matched or approximated across the two waveguides. Additionally, matching may be considered achieved where the property of the solid core waveguide has a value which is a specified proportion or percentage of the value of the property in the hollow core waveguide, or lies within a range between an upper limit for the proportion or percentage and a lower limit for the proportion or percentage. The proportion or percentage may be less than 1 or less than 100% or may be more than 1 or more than 100%.

An example of such a matched property is microbending sensitivity, which has been discussed above including mention of some example values and ranges. Microbend matching may be achieved by matching the field diameters of the fundamental optical modes supported by the two waveguides to be similar, while also providing similar outer diameters and coatings.

Other properties may be matched across the waveguides in addition to or instead of matching microbending sensitivity. As just mentioned, the mode field diameters (MFD) of the fundamental modes may be matched. For example, the solid core waveguide may have a MFD up to 200% of the MFD of the hollow core waveguide, such as up to 150% or up to 120% or up to 100%, or about equal to the hollow core waveguide's MFD. In other examples, the solid core waveguide may have a MFD which is in the range of 10% to 200%, or 10% to 150%, or 50% to 200%, or 50% to 150%, or 80% to 120% of the MFD of the hollow core waveguide. Also, the outer diameters of the waveguides may be matched within any of the same example ranges; this may be in conjunction with matching the MFD or separately from matching the MFD. The outer diameter of the hollow core waveguide is the diameter of the outer cladding, and the outer diameter of the solid core waveguide is the diameter of the cladding.

Also, the macrobend loss could be matched between the hollow core waveguide and the solid core waveguide. For example, the solid core waveguide may have a macrobend loss which is up to 200% of the macrobend loss of the hollow core waveguide at least at one wavelength, such as up to 150% or up to 120% or up to 100%, or about equal to the hollow core waveguide's macrobend loss. In other examples, the solid core waveguide may have a macrobend loss which is in the range of 10% to 200%, or 10% to 150%, or 50% to 200%, or 50% to 150%, or 80% to 120% of the macrobend loss of the hollow core waveguide.

A further property that may be matched is the inherent background attenuation of the two waveguides, being the amount of optical power lost during propagation along the waveguide absent other specific causes of loss such as microbending and macrobending. For example, the solid core waveguide may have an attenuation up to 100% of the attenuation of the hollow core waveguide at least at one wavelength, such as up to 90% or up to 80% or up to 70% or up to 50%. In other examples, the solid core waveguide may have an attenuation which is in the range of 20% to 100%, or 20% to 80%, or 50% to 100%, or 50% to 80% of the attenuation of the hollow core waveguide.

Also, temperature sensitivity may be matched, where temperature sensitivity comprises the amount by which one or more characteristics of a waveguide are modified by a change in temperature. For example, the solid core waveguide may have a temperature sensitivity up to 200% of the temperature sensitivity of the hollow core waveguide at least at one wavelength, such as up to 150% or up to 120% or up to 100%, or about equal to the hollow core waveguide's sensitivity. In other examples, the solid core waveguide may have a temperature sensitivity which is in the range of 10% to 200%, or 10% to 150%, or 50% to 200%, or 50% to 150%, or 80% to 120% of the temperature sensitivity of the hollow core waveguide.

In any assembly, any or all of these properties may be matched between the hollow core waveguide and the solid core waveguide, or no properties may be matched if it is considered that the shared mechanical environment provided by the jacket offers adequate similarity of performance between the solid core waveguide and the hollow core waveguide. An assembly may have one or more matched properties according to these examples in addition to or instead of a minimal waveguide core spacing as specified above. Alternatively, an assembly may have none of these particular specifications while still comprising an appropriate common mechanical environment that enables diagnosis to be sufficiently accurate in a given situation. A smaller spacing together with one or more matched properties will likely enhance the accuracy.

Note also that while the hollow core waveguide and the solid core waveguide have a mechanical relationship or coupling such that they experience a shared mechanical environment, there may or may not be any optical relationship or contact between the waveguides (by which is meant that a propagating wave can at least partly couple from one waveguide to the other). According to different requirements and situations, there may or may not be benefit to enabling optical contact in an assembly. Referring to the particular examples described above, optical contact is possible is the examples of FIGS. 4, 5, 6 and 7, and not possible in the examples of FIGS. 8, 9, 10 and 11 owing to the inclusion of individual coating layers (plus additional layers in the case of FIG. 11) around the separate waveguides. Optical contact is integral to the example of FIG. 6. Hence, a particular configuration of assembly may be selected according to whether or not optical contact is required.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/ or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] U.S. Pat. No. 9,904,008
[2] WO 2015/185761
[3] S E Barkou et al, "Photonic bandgap fibers", LEOS '99, IEEE Lasers and Electro-Optics Society 1999 12$^{th}$ Annual Meeting, vol. 2 IEEE 1999
[4] J Broeng et al, "Analysis of air-guiding photonic bandgap fibers", Optics Letters vol. 25(2), pp 96-98, 2000
[5] Francesco Poletti, "Nested antiresonant nodeless hollow core fiber," Opt. Express, vol. 22, pp. 23807-23828, 2014
[6] JR Hayes et al, "Antiresonant hollow core fiber with an octave spanning bandwidth for short haul data communications", Journal of Lightwave Technology vol. 35(3), 437-442 (2017)
[7] S Jain et al, "Multi-element fiber technology for space-division multiplexing applications", Optics Express, vol. 22(4), pp. 3787-3796 (2014)
[8] US 2017/0031121
[9] U.S. Pat. No. 8,215,129
[10] U.S. Pat. No. 6,154,594
[11] U.S. Pat. No. 6,826,335
[12] U.S. Pat. No. 3,324,233

The invention claimed is:

1. A method of testing a hollow core optical waveguide, the method comprising:

providing the hollow core optical waveguide in an optical fibre assembly;

launching one or more test light signals into a solid core optical waveguide of the optical fibre assembly;

detecting a portion of the test light signals emitted from the solid core optical waveguide proximate one or both ends of the optical fibre assembly;

analysing the detected portion of the test light signal to determine a state of the solid core optical waveguide;

deducing a state of the hollow core optical waveguide of the optical fibre assembly from the determined state of the solid core optical waveguide; and designating the optical fibre assembly as operable or inoperable according to the deduced state of the hollow core optical waveguide.

2. The method according to claim 1, wherein the optical fibre assembly comprises an optical fibre cable, the method further comprising deploying the optical fibre cable as an optical signal transmission pathway before or during the launching of the one or more test light signals.

3. The method according to claim 1, wherein the launching, detecting and analysing is in accordance with at least one of a visual fibre tracer technique, a visual fault locator technique, an optical time domain reflectometry technique or an optical frequency domain reflectometry technique for testing optical fibres.

4. The method according to claim 1, wherein the optical fibre assembly comprises:

a hollow core optical waveguide comprising a hollow core surrounded by a structured arrangement of longitudinally extending capillaries providing an inner cladding surrounded by an outer cladding;

a diagnostic solid core optical waveguide comprising a solid core surrounded by a cladding, and extending substantially parallel to the hollow core optical waveguide; and a jacket surrounding both the hollow core optical waveguide and the solid core optical waveguide and forming a common mechanical environment for the hollow core optical waveguide and the solid core optical waveguide.

5. The method according to claim 4, wherein one or more properties of the hollow core optical waveguide and of the solid core waveguide are matched, the properties comprising: microbending sensitivity, fundamental mode field diameter, outer diameter of the cladding, macrobend loss, background optical attenuation, and temperature sensitivity.

6. The method according to claim 4, wherein the hollow core optical waveguide is a photonic bandgap waveguide configured to guide light along the hollow core by a photonic bandgap effect, the inner cladding comprising a microstructured regular array of longitudinally extending capillaries.

7. The method according to claim 6, wherein the hollow core optical waveguide is a nested antiresonant nodeless hollow core waveguide, the inner cladding comprising one or more additional capillaries nested within each longitudinally extending capillary.

8. The method according to claim 4, wherein the solid core of the solid core optical waveguide is embedded in the outer cladding of the hollow core optical waveguide so that the outer cladding acts as the cladding of the solid core optical waveguide, and optionally including one or more additional solid cores embedded in the outer cladding to provide one or more additional solid core optical waveguides.

9. A method of testing a hollow core optical waveguide, the method comprising:

providing the hollow core optical waveguide in an optical fibre assembly, wherein the optical fibre assembly comprises:

a hollow core optical waveguide comprising a hollow core surrounded by a structured arrangement of longitudinally extending capillaries providing an inner cladding surrounded by an outer cladding; and a diagnostic solid core optical waveguide comprising a solid core surrounded by a cladding, and extending substantially parallel to the hollow core optical waveguide; and launching one or more test light signals into the solid core optical waveguide of the optical fibre assembly;

detecting a portion of the test light signals emitted from the solid core optical waveguide proximate one or both ends of the optical fibre assembly;

analysing the detected portion of the test light signal to determine a state of the solid core optical waveguide;

deducing a state of the hollow core optical waveguide of the optical fibre assembly from the determined state of the solid core optical waveguide; and designating the optical fibre assembly as operable or inoperable according to the deduced state of the hollow core optical waveguide.

10. The method according to claim 9, wherein the optical fibre assembly further comprises a jacket surrounding both the hollow core optical waveguide and the solid core optical waveguide and forming a common mechanical environment for the hollow core optical waveguide and the solid core optical waveguide.

11. The method according to claim 9, wherein the optical fibre assembly comprises an optical fibre cable, the method further comprising deploying the optical fibre cable as an optical signal transmission pathway before or during the launching of the one or more test light signals.

12. The method according to claim 9, wherein the launching, detecting and analysing is in accordance with at least one of a visual fibre tracer technique, a visual fault locator technique, an optical time domain reflectometry technique or an optical frequency domain reflectometry technique for testing optical fibres.

13. The method according to claim 9, wherein the hollow core, inner cladding and outer cladding of the hollow core optical waveguide form a first optical fibre strand which has a coating layer, and the solid core and cladding of the solid core optical waveguide form a second optical fibre strand which has a coating layer and is distinct from the first optical fibre strand, the optical fibre assembly further comprises an inner buffer layer surrounding the coated optical fibre strands.

14. The method according to claim 9, wherein the hollow core, inner cladding and outer cladding of the hollow core optical waveguide form a first optical fibre strand which has a coating layer, and the solid core and cladding of the solid core optical waveguide form a second optical fibre strand which has a coating layer and is distinct from the first optical fibre strand, and the optical fibre assembly further comprises a filler material occupying space between the coated fibre strands and the hollow tube.

15. The method according to claim 9, wherein the optical fibre assembly further comprises an elongate strengthener extending substantially parallel to the hollow core optical waveguide and the solid core optical waveguide.

16. A method of testing a hollow core optical waveguide, the method comprising:

providing the hollow core optical waveguide in an optical fibre assembly of an optical fibre cable comprising a hollow core optical waveguide, a solid core optical waveguide, and a jacket;

launching one or more test light signals into the solid core optical waveguide of the optical fibre assembly comprising an optical fibre;

detecting a portion of the test light signals emitted from the solid core optical waveguide proximate one or both ends of the optical fibre assembly;

analysing the detected portion of the test light signal to determine a state of the solid core optical waveguide;

deducing a state of the hollow core optical waveguide of the optical fibre assembly from the determined state of the solid core optical waveguide;

designating the optical fibre assembly as operable or inoperable according to the deduced state of the hollow core optical waveguide; and deploying the optical fibre cable as an optical signal transmission pathway before or during the launching of the one or more test light signals.

17. The method according to claim 16, wherein the launching, detecting and analysing is in accordance with at least one of a visual fibre tracer technique, a visual fault locator technique, an optical time domain reflectometry technique or an optical frequency domain reflectometry technique for testing optical fibres.

18. The method according to claim 16, wherein:

the hollow core optical waveguide comprises a hollow core surrounded by a structured arrangement of longitudinally extending capillaries providing an inner cladding surrounded by an outer cladding;

the solid core optical waveguide comprises a solid core surrounded by a cladding, and extending substantially parallel to the hollow core optical waveguide; and the jacket surrounds both the hollow core optical waveguide and the solid core optical waveguide and forming a common mechanical environment for the hollow core optical waveguide and the solid core optical waveguide.

19. The method according to claim 18, The method according to claim 1, wherein one or more properties of the hollow core optical waveguide and of the solid core waveguide are matched, the properties comprising: microbending sensitivity, fundamental mode field diameter, outer diameter of the cladding, macrobend loss, background optical attenuation, and temperature sensitivity.

20. The method according to claim 18, wherein the hollow core optical waveguide is a photonic bandgap waveguide configured to guide light along the hollow core by a photonic bandgap effect, the inner cladding comprising a microstructured regular array of longitudinally extending capillaries.

\* \* \* \* \*